US009355313B2

(12) United States Patent
Sesum et al.

(10) Patent No.: US 9,355,313 B2
(45) Date of Patent: May 31, 2016

(54) DETECTING AND EXTRACTING IMAGE DOCUMENT COMPONENTS TO CREATE FLOW DOCUMENT (71) Applicant: Microsoft Corporation, Redmond, WA (US)

(72) Inventors: Milan Sesum, Belgrade (RS); Ivan Vujic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 141 days.

(21) Appl. No.: 14/205,171

(22) Filed: Mar. 11, 2014

(65) Prior Publication Data
US 2015/0262007 A1 Sep. 17, 2015

(51) Int. Cl.
*G06K 9/34* (2006.01)
*G06K 9/00* (2006.01)
*G06K 9/62* (2006.01)

(52) U.S. Cl.
CPC ........ *G06K 9/00469* (2013.01); *G06K 9/00456* (2013.01); *G06K 9/00463* (2013.01); *G06K 9/6261* (2013.01)

(58) Field of Classification Search
CPC .......... G06K 9/00456; G06K 9/00463; G06K 9/00469; G06K 9/6261
See application file for complete search history.

(56) References Cited

U.S. PATENT DOCUMENTS

| 6,377,704 B1 | 4/2002 | Cooperman |
| 6,577,763 B2 | 6/2003 | Fujimoto et al. |
| 7,639,388 B2 | 12/2009 | Saito |
| 7,711,189 B2 | 5/2010 | Katsuyama et al. |
| 8,249,356 B1 | 8/2012 | Smith |
| 8,443,278 B2 | 5/2013 | Mansfield et al. |
| 2004/0165774 A1* | 8/2004 | Koubaroulis ...... G06K 9/00409 382/179 |

(Continued)

FOREIGN PATENT DOCUMENTS

| JP | H11232439 A | 8/1999 |
| WO | 2013110288 A1 | 8/2013 |

OTHER PUBLICATIONS

Jain, et al., "Document Representation and Its Application to Page Decomposition", In Proceedings of IEEE Transactions on Pattern Analysis and Machine Intelligence, vol. 20, No. 3, Mar. 1, 1998, pp. 294-308.

(Continued)

*Primary Examiner* — Phuoc Tran
(74) *Attorney, Agent, or Firm* — Jessica Meyers; Jim Ross; Micky Minhas (57) ABSTRACT One or more components of an image document may be detected and extracted in order to create a flow document from the image document. Components of an image document may include text, one or more paths, and one or more images. The text may be detected using optical character recognition (OCR) and the image document may be binarized. The detected text may be extracted from the binarized image document to enable detection of the paths, which may then be extracted from the binarized image document to enable detection of the images. In some examples, the images, similar to the text and paths, may be extracted from the binarized image document. The extracted text, paths, and/or images may be stored in a data store, and may be retrieved in order to create a flow document that may provide better adaption to a variety of reading experiences and provide editable documents.

18 Claims, 7 Drawing Sheets

(56) References Cited

U.S. PATENT DOCUMENTS

| | | | |
|---|---|---|---|
| 2007/0140560 A1 | 6/2007 | Katsuyama et al. | |
| 2009/0110288 A1 | 4/2009 | Fujiwara | |
| 2011/0258195 A1 | 10/2011 | Welling et al. | |
| 2013/0294696 A1* | 11/2013 | Sun | G06T 7/004 382/182 |
| 2014/0013215 A1 | 1/2014 | Sesum et al. | |
| 2014/0067631 A1* | 3/2014 | Dhuse | G06Q 40/10 705/30 |
| 2014/0133767 A1* | 5/2014 | Lund | G06K 9/38 382/229 |
| 2014/0247470 A1* | 9/2014 | Hunt | H04N 1/00251 358/302 |
| 2015/0242684 A1* | 8/2015 | Arad | G06K 9/00456 382/176 |

OTHER PUBLICATIONS

Liang, et al., "Document layout structure extraction using bounding boxes of different entities", In Proceedings of 3rd IEEE Workshop on Applications of Computer Vision, Dec. 2, 1996, pp. 278-283.

"International Search Report and Written Opinion Issued in PCT Patent Application No. PCT/US2015/019342", Mailed Date: Jun. 22, 2015, 14 Pages.

Rege, et al., "Text-Image Separation in Document Images Using Boundary/Perimeter Detection", In Journal of International Signal & Image Processing, vol. 3, No. 1, Jan. 2012, pp. 10-14.

Second Written Opinion Issued in PCT Application No. PCT/US2015/019342, Mailed Date: Feb. 9, 2016, 5 Pages.

* cited by examiner

DETECTING AND EXTRACTING IMAGE DOCUMENT COMPONENTS TO CREATE FLOW DOCUMENT

BACKGROUND

Optical character recognition (OCR) technology may be used to extract text from an image document such as a portable document format (PDF). OCR may detect lines of text, words in each line, a bounding box, and text for each word. Complex layout elements and properties of the image document, such as paragraphs, tables, columns, and footnotes, may be recognized, and the image document may be serialized to any flow document, such as an Open XML Format Document file (DOCX) or a HyperText Markup Language (HTML), for example.

If the image document includes several images to be converted into the flow document, additional analysis may be needed to detect sections, where a section is based on a set of major document properties. Current technology used to convert image documents to flow documents may focus on matching visual fidelity rather than preserving flow in the conversion. As a result, the flow document may include a section break at an end of each page and unrecognizable section properties.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to detection and extraction of one or more components of an image document in order to create a flow document from the image document. Components of an image document may include text, one or more paths, and one or more images, for example. The text of the image document may be detected using optical character recognition (OCR), and the image document may be binarized. The detected text may be extracted from the binarized image document in order to detect the one or more paths, which may then be extracted from the binarized image document to enable detection of the one or more images. In some examples, the images, similar to the text and paths, may be extracted from the binarized image document. The extracted text, paths, and/or images may be stored in a data store that may be retrieved in order to create a flow document that may provide better adaption to a variety of reading experiences and provide editable documents.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, an example image document may include text, one or more images, and one or more paths, where the paths may represent layout elements such as paragraph borders, table borders, underlines, and text borders, for example. The text of the image document may be detected using optical character recognition (OCR) and the image document may be binarized. The detected text may be extracted from the binarized image document in order to detect the one or more paths, which may then be extracted from the binarized image document to enable detection of the one or more images. In some example, the images, similar to the text and paths, may be extracted from the binarized image document. The extracted text, paths, and/or images may be stored in a data store that may be retrieved in order to create a flow document that may provide better adaption to a variety of reading experiences and provide editable documents.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for detecting and extracting one or more components of an image document in order to create a flow document from the image document. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
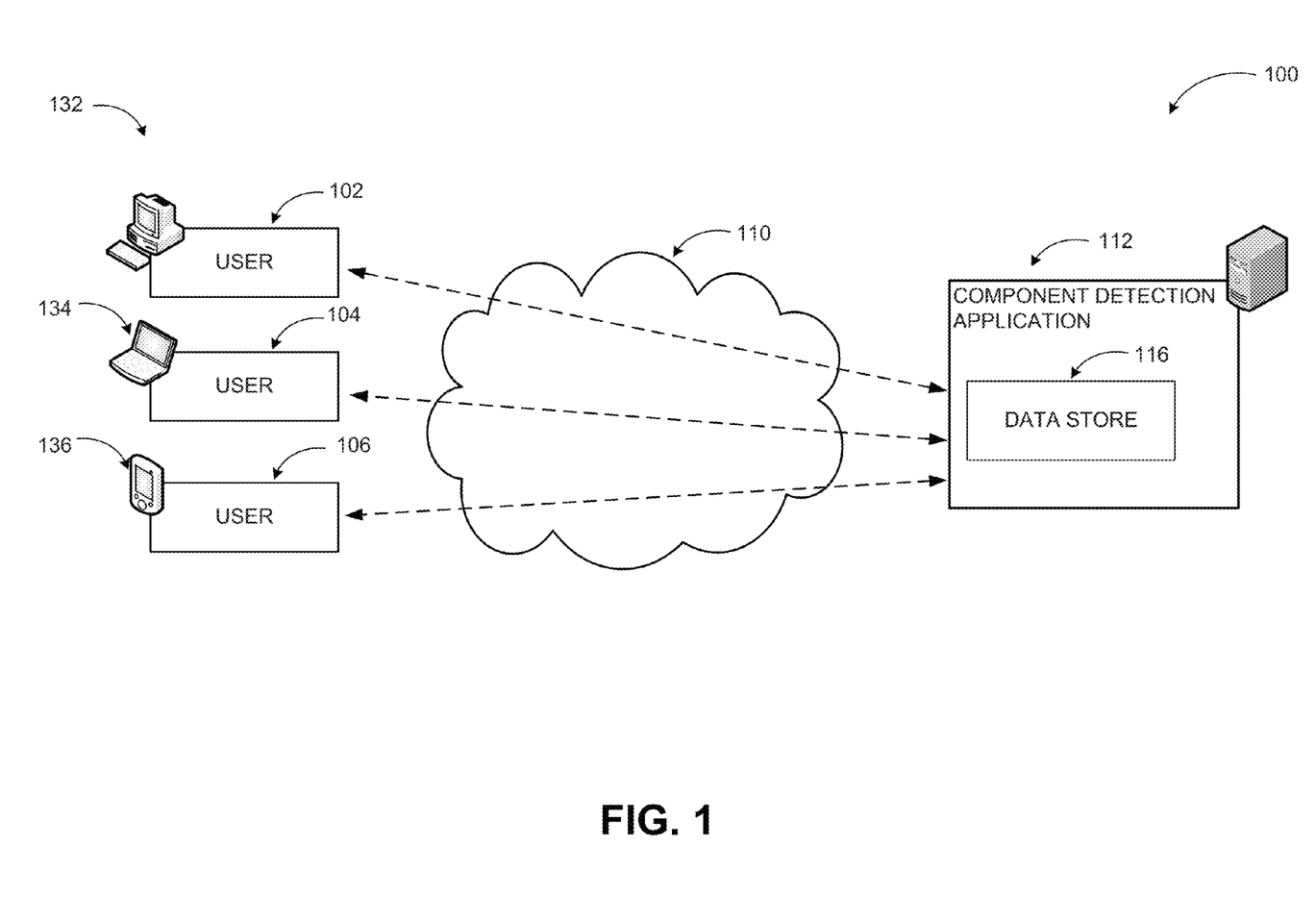
FIG. 1 includes a conceptual diagram illustrating an example networked environment, where detection and extraction of one or more components of an image document may be implemented.

FIG. 1 includes a conceptual diagram illustrating an example networked environment, where detection and extraction of one or more components of an image document may be implemented, according to some embodiments.

As demonstrated in diagram 100, one or more users (102, 104, and 106) may access an application, such as a component detection application 112, over a cloud-based network 110. The component detection application 112 may be hosted at a remote server, and may be accessed through a user's client device over the cloud-based network 110. A local version of the component detection application 112 may also be locally hosted at the user's client device, and data associated with the local component detection application 112 may be retrieved over the cloud-based network 110. Some example client devices may include a desktop computer 132, a laptop computer 134, a smart phone 136, a car phone, a mobile phone, a tablet, and/or a home automation device.

An example component detection application 112 may enable detection of one or more components of an image document, such as text, one or more images, and one or more paths representing layout elements, which may be implemented over a network, such as the cloud-based network 110. Upon receiving an image document, the component detection application 112 may detect the text employing OCR and binarize the image document. The detected text may be extracted from the binarized image document in order to detect the paths of the image document, which may then be extracted to detect the images. In some examples, the images, similar to the text and paths, may be extracted from the binarized image document. The extracted text, paths, and/or images may be stored in a data store, such as data store 116, and may be retrieved in order to create a flow document that may provide better adaption to a variety of reading experiences and provide editable documents. Different types of data associated with the component detection application 112 such as software data, application data, and other similar data may be received from the component detection application 112 and interacted with at the user's client device.

Data associated with the component detection application 112 may be hosted at the data store 116 associated with the component detection application 112. The data store 116 may retrieve and store data as requested by the component detection application 112, including applications locally executed on individual client devices across a network, such as the cloud based network 110. In an example embodiment, when a user interacts with the component detection application 112 over the network from the user's client device, a request may be sent to the component detection application 112 to retrieve data in order to respond to and fulfill the request. Example requests may include to create a flow document from the image document, where the one or more detected and/or extracted components from the image document may be retrieved from the data store 116.

The example system in FIG. 1 has been described with specific servers, client devices, applications, and interactions. Embodiments are not limited to the system according to this example configuration. A platform detecting and extracting one or more components of an image document in order to create a flow document from the image document may be implemented in configurations employing fewer or additional components, and performing other tasks. Furthermore, platforms detecting and extracting one or more components of an image document in order to create a flow document from the image document may be implemented in a similar manner using the principles described herein.

Figure 2:
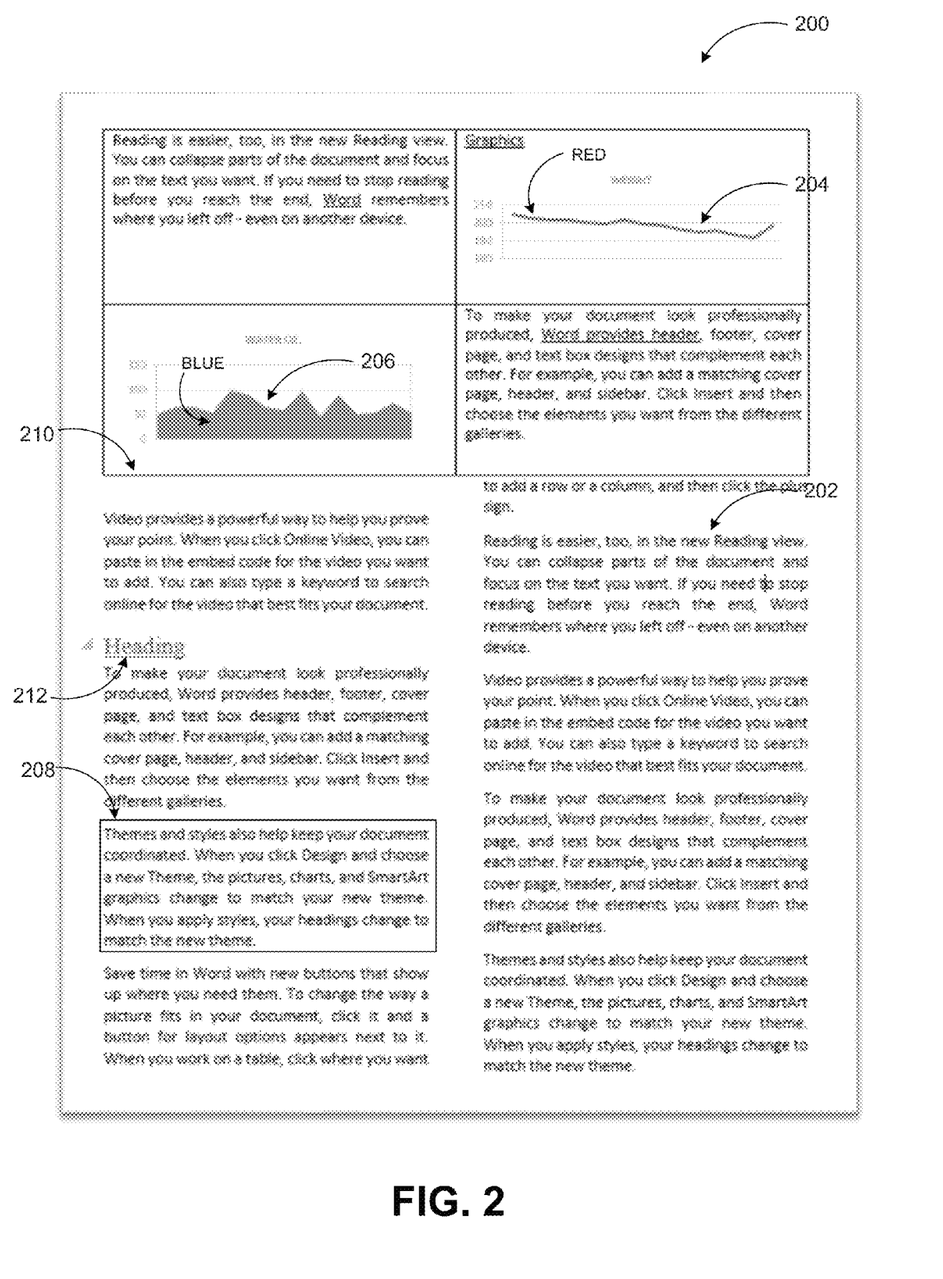
FIG. 2 illustrates an example image document.

FIG. 2 illustrates an example image document, according to some embodiments.

As illustrated in diagram 200, components of an image document may include text 202, one or more images (204, 206), and one or more paths. The images (204,206) may include photographs, charts, graphs, and other similar graphical elements. In some image documents, the images (204, 206) may be colored. For example, a first image 204 may be red and a second image 206 may be blue, as illustrated in FIG. 2. The paths of the image document may represent basic elements, such as paragraph borders 208, table borders 210, underlines 212, and text borders, for example. Remaining components of the image document may be considered non-relevant. When words and paths are removed from a binarized image document, from remaining components in the binarized image document, images are detected. If background has bright color (yellow, for example), it may be turned into white on binarized image and may not be reconstructed. If background has dark color (black, for example), it may be black on binarized image, and that part of an input image may be reconstructed as image.

Upon receiving an image document, such as the example image document in diagram 200, from a user through a client device, a component detection application may detect the text 202 from the image document. An OCR engine may employ OCR to detect the text of the image document, where recognized text, a bounding box, an array of glyphs, and one or more baseline points may be determined for each word in the detected text. The OCR engine may unify the bounding boxes for each word in the detected text. For example, for each word, an ascent and descent may be calculated based on the baseline points, where the ascent is a height of a tallest character of the word above the baseline points and descent is the height of a tallest character of the word below the baseline points. The words may then be divided into several clusters according to font family and size. For each cluster, a maximal ascent and descent may be calculated, and for each word, the bounding box may be recalculated according to the baseline points.

If the received image document is rotated, the angle may be detected by the OCR engine and if the angle detected is more than 1 degree, for example, the OCR engine may rotate the image document to 0 degrees prior to the text detection. If the angle detected is less than 1 degree the OCR engine may not rotate the image document, as it may decrease efficiency of the OCR. The rotation examples provided herein are for illustration purposes. Other rotation thresholds may be defined depending on implementation specifics.

Figure 3:
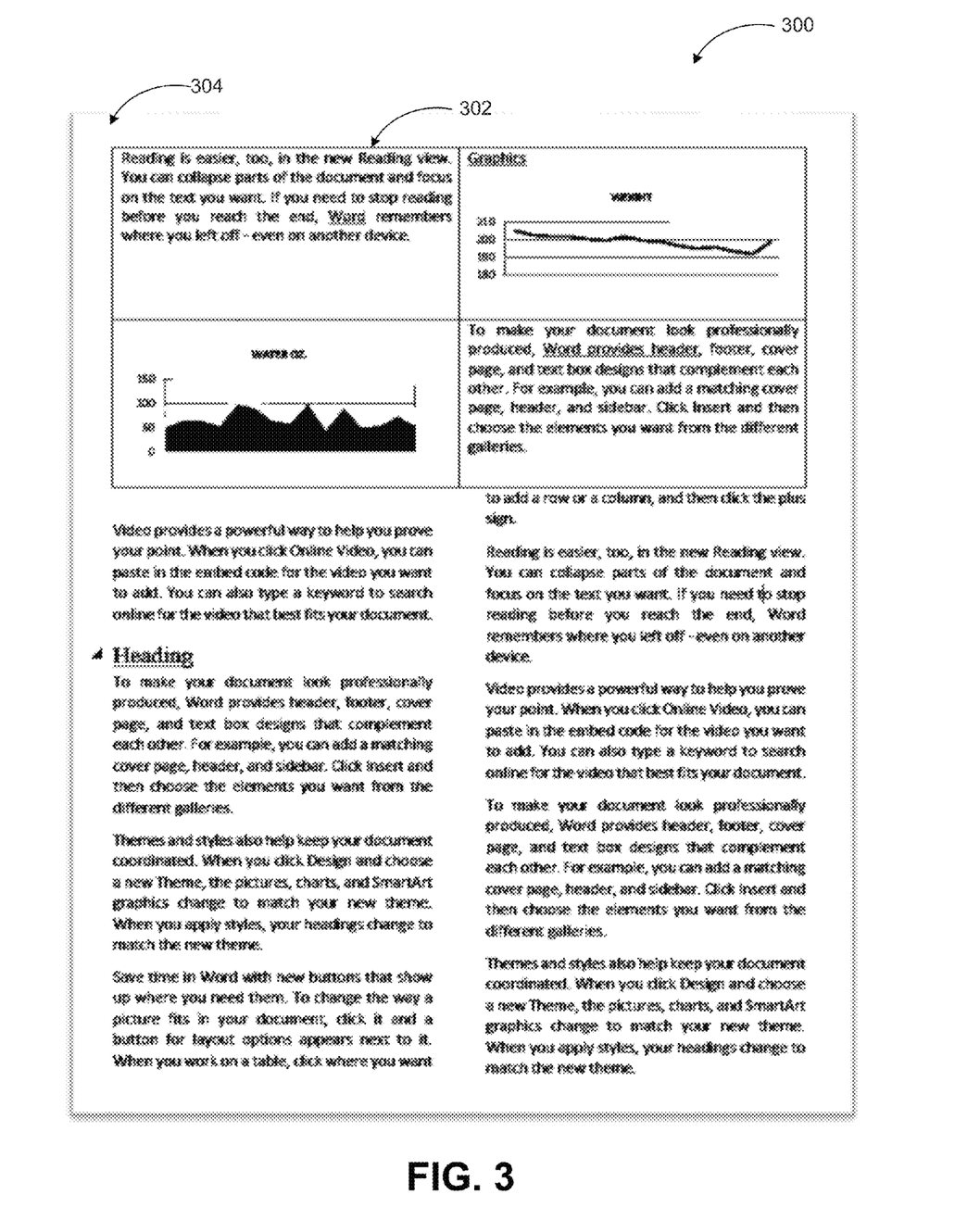
FIG. 3 illustrates an example of a binarized image document.

FIG. 3 illustrates an example of a binarized image document, according to some embodiments.

As illustrated in diagram 300, binarization of an image document may create an image where relevant components of the image document are displayed as black pixels 302 and non-relevant components of the image document are displayed as white pixels 304. Relevant components of the image document may include text, one or more images, and one or more paths. Non-relevant components of the image document may include background that is not a part of the text, the images and/or the paths.

A Sauvola method of binarization may be used to create the image composed of black and white pixels. The Sauvola method may use rapid image surface analysis for algorithm selection and adaptation according to the image document contents, such as the text, paths, and images. For example, image content may be subjected to a different type of analysis than textual content. The contents may be used to select the algorithm type and need for parameterization, if any, and to compute and propose a threshold value for each or every nth pixel of the image document in order to guide the binarization process. Degradations, such as noise, may be managed within each algorithm structure to filter out the degradations.

Figure 4:
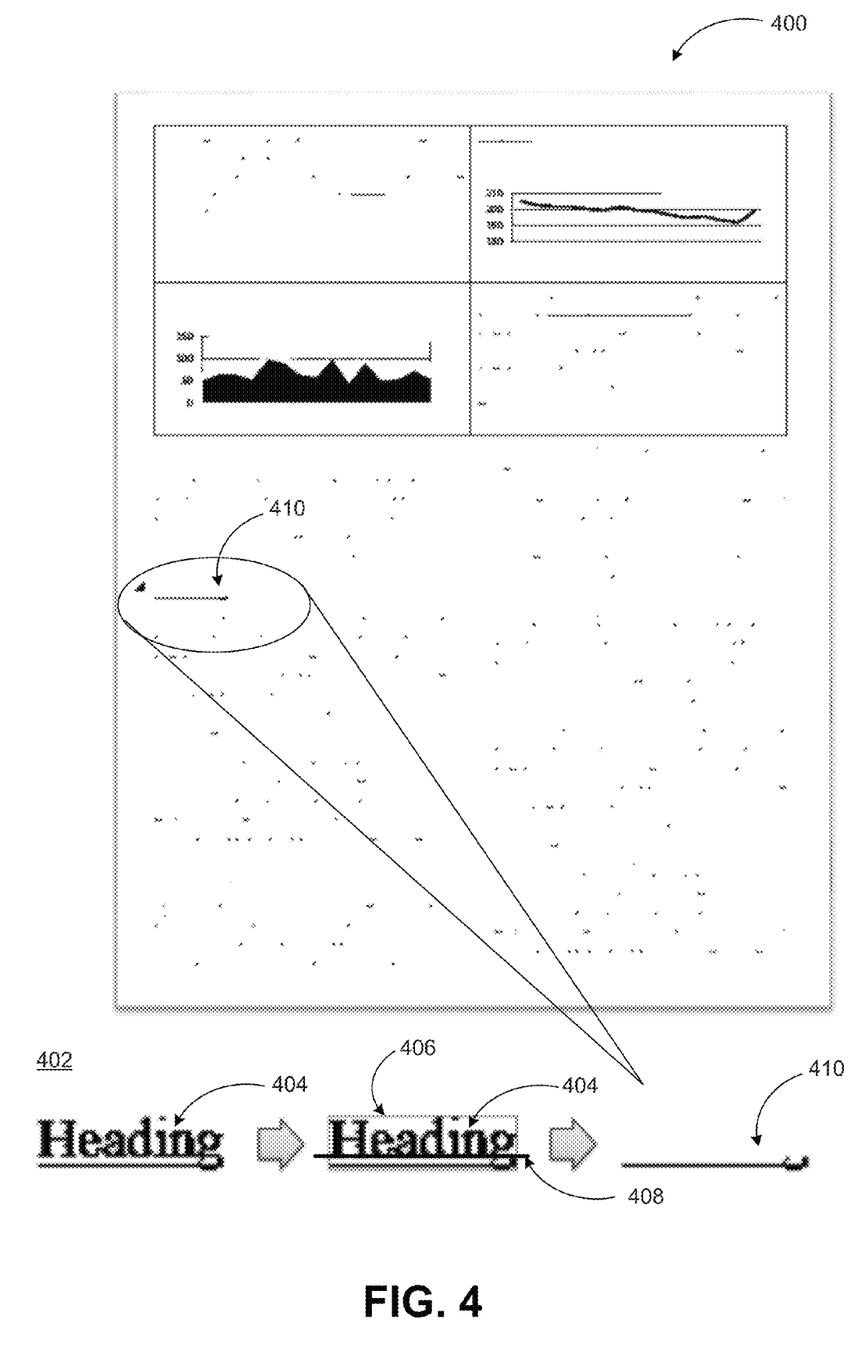
FIG. 4 illustrates an example of a binarized image document with text extracted.

FIG. 4 illustrates an example of a binarized image document with text extracted, according to embodiments.

Following binarization of an image document, previously detected text from the image document may be extracted and stored in a data store, as illustrated in diagram 400. The text from the image document may have been previously detected using OCR, where recognized text 404, such as "Heading," a bounding box 406, an array of glyphs, and one or more baseline points 408 may have been determined for each word in the detected text, as discussed in FIG. 2. A process of text extraction may be illustrated by flow configuration 402.

The recognized text 404 may be extracted from the binarized image document by coloring the bounding box 406 above the baseline points 408 for each word of the detected text into a background color. The background color may be determined by counting a number of black and white pixels surrounding the bounding box for each word. For example, if there is a higher number of black pixels than white pixels surrounding the bounding box, the background color may be black. Alternatively, if there is a higher number of white pixels than black pixels surrounding the bounding box, the background color may be white. In the flow configuration 402, the bounding box 406 may be colored white above the baseline points 408 because there are a higher number of white pixels than black pixels surrounding the bounding box 406 and thus, the background color is white.

Some parts of the recognized text 404, such as lower parts of the letters g, y, p, and j, punctuation elements, and layout elements, such as underlines, may not be extracted as they are below the baseline points 408, as illustrated by 410. Other noise from the binarized image document may also be present, where noise is one or more black pixels present in the binarized image document that are not recognized text and are not relevant components of paths or images of the image document. The noise may be removed from the binarized image document to prevent false positive paths and images from being detected.

Once the detected text is extracted and the noise is removed, one or more paths within the binarized image may be detected using one or more algorithms. The paths may be vertical and/or horizontal and may represent basic elements of the image document, such as paragraph borders, table borders, underlines, and text borders, for example. In each column of pixels in the binarized image document, vertical paths may be detected as arrays of successive black pixels, and in each row of pixels in the image document, horizontal paths may be detected as arrays of successive black pixels. The initial vertical and/or horizontal paths detected may be a preliminary set of paths, as the paths may include false positives. To remove a first set of false positives, vertical paths that have a small height in comparison to the image document and horizontal paths that have a small width in comparison to the image document may be discarded from the set. To remove a second set of false positives, non-linear vertical and/or horizontal paths may be discarded. Additionally, paths that are not detected as basic elements of the image document may be discarded as a third set of false positives.

As discussed in the example rotation scenario in conjunction with FIG. 2 above, if a received image document is rotated, the angle may be detected by an OCR engine, and if the angle detected is more than 1 degree, the OCR engine may rotate the image to 0 degrees prior to the text detection. If the angle detected is less than 1 degree, the OCR engine may not rotate the image as it may decrease OCR accuracy. However, even a slight angle may decrease the ability to detect and extract the one or more images of the image document, and, therefore, an angle of rotation may be determined following path detection. The angle of rotation of the binarized image document may be determined by using the one or more detected paths or by using one or more lines detected by the OCR.

In a first example embodiment, the angle of rotation of the binarized image document may be determined using the detected paths. The detected vertical paths may be combined into vertical connected components, and the detected horizontal paths may be combined into horizontal connected components. For example, if two horizontal paths are touching each other, they may be combined into a same horizontal connected component. The vertical connected components that are too small in height, and/or horizontal connected components that are too small in width in comparison to the image document may be discarded. For example, a horizontal connected component that has a width less than half a width of the image document may be discarded. Non-linear vertical and/or horizontal connected components may also be discarded. To verify linearity of the connected components, a first and a second linear threshold may be established within a bounding box for connected components. For example, if (left, right, top, bottom) is the bounding box for a connected component then linear thresholds are established at the following points within the bounding box, [(left, (top+bottom)/2), ((left+right)/2, bottom)] and [((left+right)/2, top), (right, (top+bottom)/2)]. If there are black pixels above the second linear threshold and below the first linear threshold, and the connected component is not line, the connected component may be discarded.

For the vertical and/or horizontal connected components that are not discarded as described above, the rotation angle may be calculated using one or more algorithms. For example, if (left, right, top, bottom) is a bounding box of a connected component, an algorithm may find all paths in the connected component that have left of the bounding box equal to left. Among these paths, find the top and bottom path (the path with the lowest top and the path with the highest bottom) to determine the left point of the connected component as middle of the top and bottom path. Using a similar algorithm, the right point of the connected component can be calculated. The rotation angle of the connected component may be a slope of the line between the left and right point of the connected component.

In a second example embodiment, the angle of rotation of the binarized image document may be determined by using the one or more lines detected by the OCR. The detected lines may be sets of words that are in a same line of an image document and not far away from one another. The detected lines may be used to determine rotation angle by looking at each OCR line and taking into account the first and last word in each line. For example, if the first word in an OCR line has a bounding box (left 1, right 1, top 1, bottom 1) and the last word has a bounding box (left 2, right 2, top 2, bottom 2), a rotation angle for the OCR line may be a slope of the line between point (left 1, (top 1+bottom 1)/2) and (right 2, (top 2+bottom 2)/2). The slope of multiple OCR lines may be calculated to determine a multitude of potential rotation angles. A final rotation angle may be determined as a most common angle in an array of all the potential rotation angles determined.

In either the first or second example embodiments, if the determined rotation angle is different than 0 degrees, the binarized image may be rotated based on the determined rotation angle to achieve an angle of 0 degrees. Following rotation of the binarized image document, bounding boxes of previously detected text may be similarly rotated based on the determined rotation angle and removed from the binarized image document as described above.

Once the angle of rotation has been determined and/or the above described steps have been repeated, the detected paths may be extracted from the binarized image document in a similar manner to the text extraction process and stored in a same data store as the extracted text. For example, a path may be extracted by coloring the bounding box of the path into a background color, where the background color may be determined by counting a number of black and white pixels surrounding the bounding box for each path. At this point, remaining content of a word's bounding box below the baseline, such as 410, may be extracted for each word since the path for the underline is already detected and may be extracted. Following path extraction, only black pixels that are not text and are not paths may remain in the binarized image document. Some of these black pixels may be non-relevant noise and some of the black pixels may be relevant components of the images.

Figure 5:
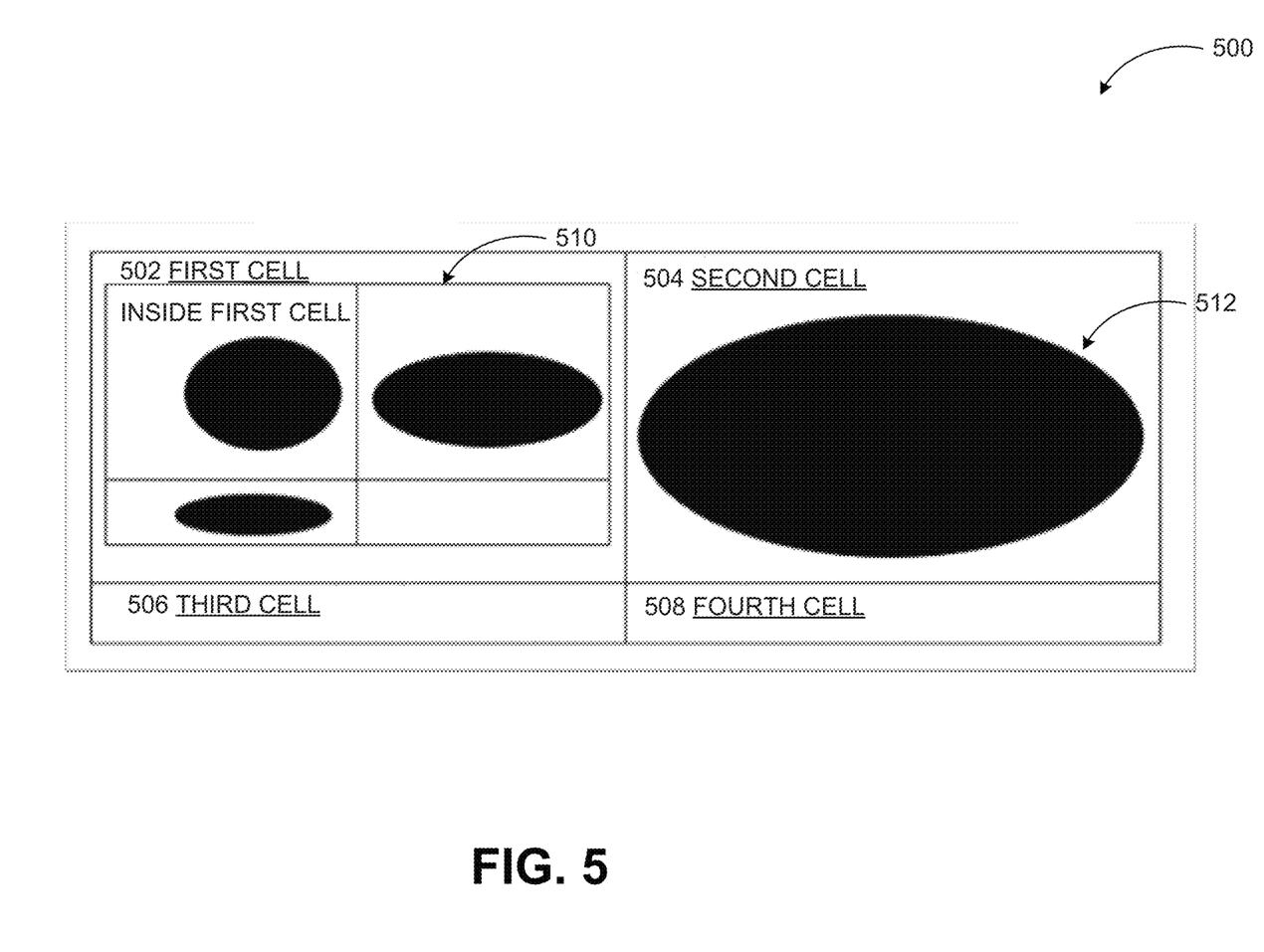
FIG. 5 illustrates an example of one or more tables developed to detect one or more images within a binarized image document.

FIG. 5 illustrates an example of one or more tables developed to detect one or more images within a binarized image document.

As discussed previously in conjunction with FIG. 4, black pixels that are not text and are not paths may remain in a binarized image document following path extraction. Some of these black pixels may be non-relevant noise and some of the black pixels may be relevant components of images. An algorithm may be employed to determine one or more connected components on the binarized image document that are relevant components of the images. If a connected component is too small, for example, if an area of the connected component is less than an area of average character on the image document, the component may be discarded as noise. However, in some image documents, there may be a large number of small connected components next to each other that together form an image. As a result, the determined connected components may be aggregated to determine the relevant components of the images in order to detect the images.

The aggregated components may be used to develop one or more tables, as illustrated in a diagram 500, where recognized tables may represent the detected images on the binarized image document. Each table may include one or more cells, such as a first cell 502, a second cell 504, a third cell 506, and a fourth cell 508. Cells from recognized tables, such as the first cell 502 and the second cell 504, may be processed from a smallest cell to a largest cell in order to prevent aggregation of objects from different cells. Cells within a cell may also be processed, such as a cell 510 inside the first cell 502. In some embodiments, the processed cells may be extracted in a similar manner to the text and path extraction process. For example, a cell may be extracted by coloring the bounding box of the cell into a background color, where the background color may be determined by counting a number of black and white pixels surrounding the bounding box for each path. Once the recognized cells representing the images are extracted they may be stored in the same data store as the extracted text and paths. The extracted text, paths, and/or images may then be retrieved from the data store in order to create a flow document from the image document using the extracted text, paths, and/or images from the image document.

The examples in FIG. 1 through 5 have been described with specific platforms including servers, applications, and interactions. Embodiments are not limited to systems according to these example configurations. Component detection and extraction in an image document in order to create a flow document from the image document may be implemented in configurations using other types of platforms including servers, applications, and interactions in a similar manner using the principles described herein.

Figure 6:
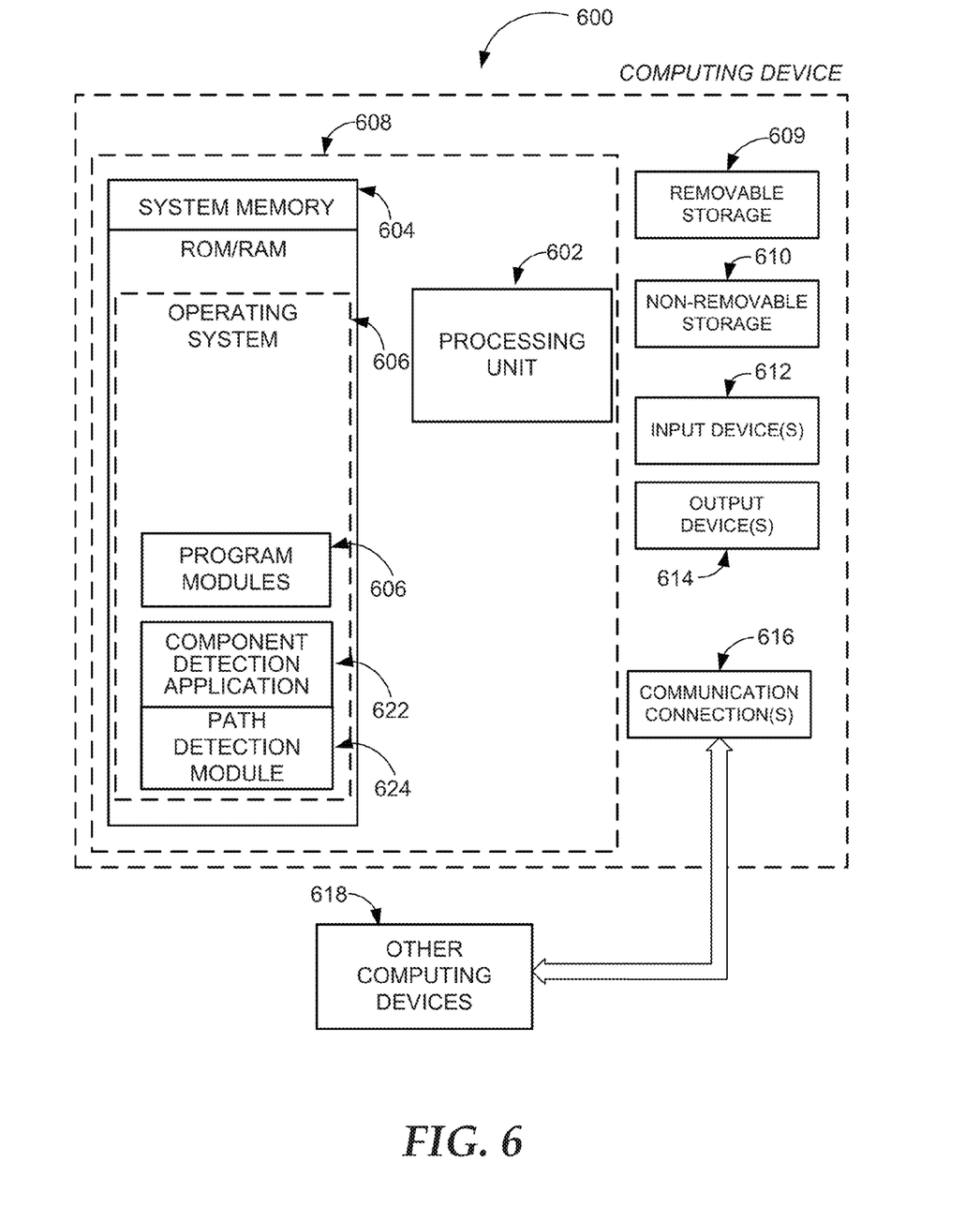
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any portable computing device with wireless communication capabilities, which may include touch and/or gesture detection capability in some examples, and include at least one processing unit 602 and system memory 604. Computing device 600 may also include multiple processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 606 suitable for controlling the operation of the platform, such as the WINDOWS®, WINDOWS MOBILE®, or WINDOWS PHONE® operating systems from MICROSOFT CORPORATION of Redmond, Wash. The system memory 604 may also include one or more software applications such as a component detection application 622, and a path detection module 624.

The component detection application 622 may detect text, one or more paths, and/or one or more images from an image document that may be extracted and stored in a data store associated with the component detection application 622. The extracted text, paths, and/or images may be retrieved from the data store in order to create a flow document from the image document using the extracted text, paths, and images. The path detection module 624 may assist in the detection of the one or more paths as well as determination of a rotation angle of the image document using the detected paths. Component detection application 622 and path detection module 624 may be separate applications or integrated modules of a hosted service. This basic configuration is illustrated in FIG. 6 by those components within dashed line 608.

Computing device 600 may have additional features or functionality. For example, the computing device 600 may also include additional data storage devices (removable and/ or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
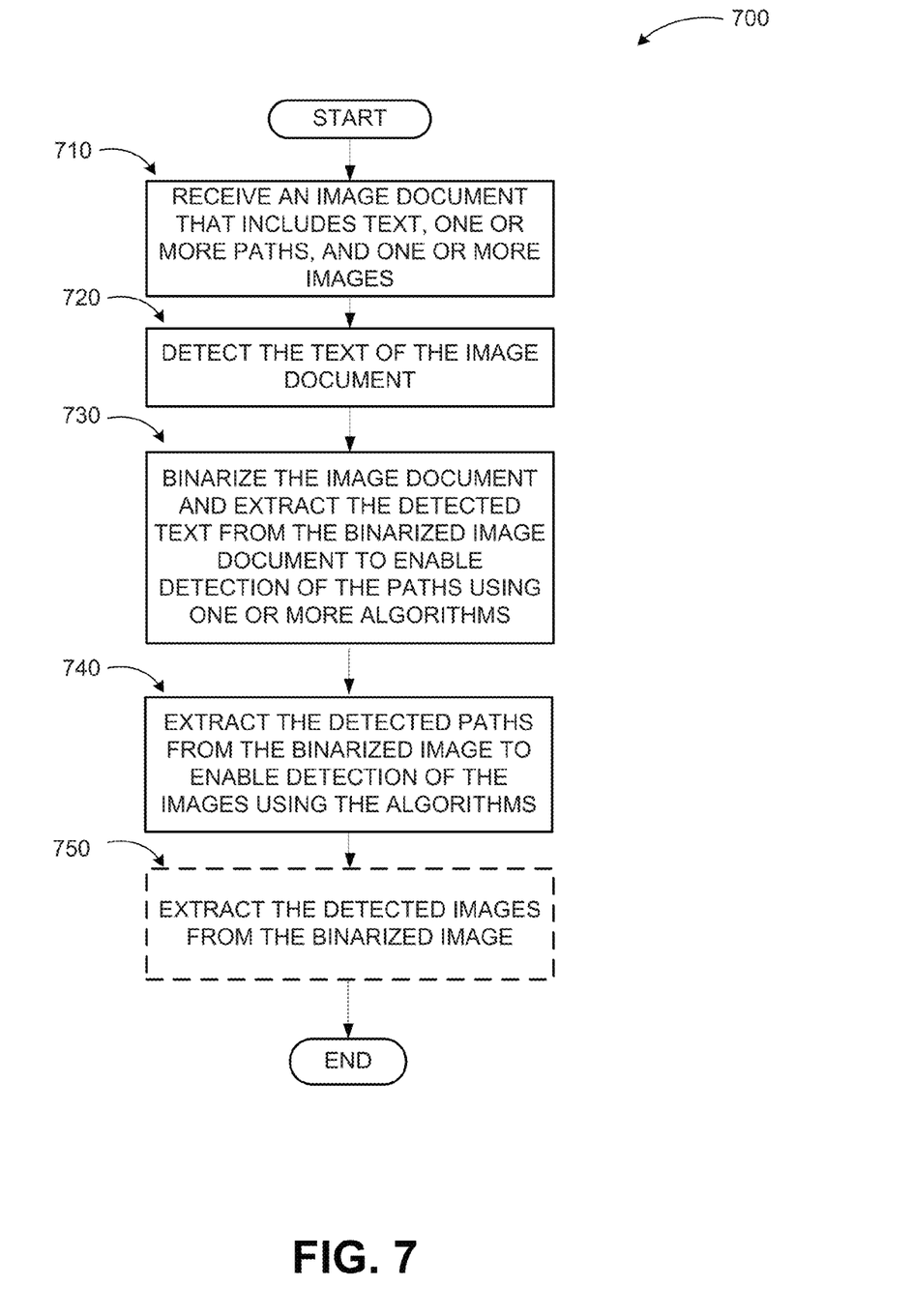
FIG. 7 illustrates a logic flow diagram of a method to detect and extract one or more components of an image document, according to embodiments.

FIG. 7 illustrates a logic flow diagram for process 700 of a method to detect and extract one or more components of an image document, according to embodiments. Process 700 may be implemented on a server or other system.

Process 700 begins with operation 710, where an image document is received at a component detection application. The image document may include text, one or more paths, and one or more images. At operation 720, the text of the image document may be detected employing OCR, where recognized text, a bounding box, an array of glyphs, and one or more baseline points may be determine for each word in the detected text.

At operation 730, the image document may be binarized and the detected text may be extracted in order to detect the paths of the image document using one or more algorithms. Binarizing the image document may create an image such that the relevant components of the image document may be black pixels and non-relevant components of the image document may be white pixels. Relevant components may include the text, paths, and images, and the non-relevant components may include background between the text and/or the images that are not layout elements represented by the paths. The detected text may be extracted from the binarized image to enable detection of the paths, where the extracted text may be stored in a data store. For example, the text may be extracted by coloring the bounding box for each word of the detected text into a background color, where the background color may be determined by counting a number of black and white pixels surrounding the bounding box for each word. The detected paths may be vertical and/or horizontal. In each column of pixels in the binarized image document, vertical paths may be detected as arrays of successive black pixels, and in each row of pixels in the image document, horizontal paths may be detected as arrays of successive black pixels. The initial vertical and/or horizontal paths detected may be a preliminary set of paths as the paths may include false positives. To remove the false positives, vertical paths that have a small height and horizontal paths that have a small width in comparison to the image document may be discarded from the set along with non-linear vertical and/or horizontal paths.

At operation 740, the detected paths may then be extracted in a process similar to the text extraction process in order to detect the images, where the extracted paths may be stored in a same data store as the extracted text. For example, the paths may be extracted by coloring the bounding box for each detected path into a background color, where the background color may be determined by counting a number of black and white pixels surrounding the bounding box for each path. Following path extraction, black pixels that are not text and are not paths may remain in the binarized image document. Some of these black pixels may be non-relevant noise, and some of the black pixels may be relevant components of the images. An algorithm may be employed to determine one or more connected components on the binarized image document to detect the relevant components of the images. If a connected component is too small, for example, if an area of the connected component is less than an area of average character on the image document, the component may be discarded as noise. However, in some image documents, there may be a large number of small connected components next to each other that together form an image. As a result, the determined connected components may be aggregated to detect the relevant components of the images. The aggregated components may be used to develop one or more tables, where recognized tables may represent the images on the binarized image document. Each table may include one or more cells that represent components of the images, and cells from the recognized tables may be processed from a smallest cell to a largest cell to detect the images.

At optional operation 750, the cells of the recognized tables may be extracted in a similar process to the text and path extraction, where the extracted images may be stored in the same data store as the extracted text and paths. For example, a cell may be extracted by coloring the bounding box of the cell into a background color, where the background color may be determined by counting a number of black and white pixels surrounding the bounding box for each path. At this point the relevant components of the image document, such as the text, paths, and images represented by the cells in recognized tables, have been detected and extracted. The extracted components stored in the data store may then be retrieved and used to create a flow document using the extracted text, paths, and/or images.

The operations included in process 700 are for illustration purposes. Detection and extraction of one or more components of an image document may be implemented by similar processes with fewer or additional steps, as well as in different order of operations using the principles described herein.

According to some embodiments, methods executed at least in part on a computing device to detect and extract one or more components of an image document are provided. An example method may include receiving an image document comprising text, one or more paths, and one or more images, detecting the text of the image document, and binarizing the image document to enable detection of the paths using one or more algorithms, where the detected text may be extracted from the binarized image document prior to detection of the paths. The example method may also include extracting the detected paths from the binarized image document to enable detection of the images using the algorithms, and extracting the detected images from the binarized image document.

In other embodiments, detecting the text of the image document may include employing optical character recognition (OCR) to detect the text of the image document, where recognized text, a bounding box, an array of glyphs, and one or more baseline points for each word may be determined in the detected text. Binarizing the image document may include creating an image, where the text, the paths, and the images of the image document may be displayed as black pixels in the created image. A Sauvola binarization method may be used to binarize the image document. Detection of the images using the algorithms may include determining one or more connected components on the binarized image document, where a connected component may be one or more touching pixels, aggregating the connected components to detect the images, and developing one or more tables from the aggregated components to represent the detected components, where one or more cells in the tables may represent one or more components of the detected images.

In further embodiments, extracting the detected images from the binarized image document may include coloring a bounding box for each cell in the tables into a background color. Extracting the text from the binarized image document may include coloring a bounding box above a baseline for each word in the detected text into a background color. Extracting the one or more detected paths from the binarized image document may include coloring a bounding box for each detected path into a background color. The background color may be determined by counting a number of black and white pixels surrounding the bounding box, where the background color may be black if a higher number of black pixels than white pixels are counted surrounding the bounding box, and the background color may be white if a higher number of white pixels than black pixels are counted surrounding the bounding box. Noise may be removed from the binarized image document prior to detection of the paths, where the noise may be one or more black pixels present in the binarized image document that are not the text, the paths, and the images of the image document. A rotation angle of the binarized image document may be determined using the detected paths or one or more lines detected from OCR, where the binarized image document may be rotated based on the determined rotation angle.

According to some examples, computing devices to detect and extract one or more components of an image document are described. An example computing device may include a memory storing instructions and a processor coupled to the memory, the processor executing a component detection application in conjunction with the instructions stored in the memory. The component detection application may be configured to receive an image document comprising text, one or more paths, and one or more images, employ OCR to detect the text from the image document, and binarize the image document to enable detection of the paths in the image document using one or more algorithms, where the detected text from the image document may be extracted prior to detection of the paths. The component detection application may further be configured to extract the detected paths on the binarized image document to enable detection of the images using the algorithms, and extract the detected images from the binarized image document.

In other examples, the detected paths may be vertical paths and horizontal paths, where the vertical paths may be detected as arrays of successive black pixels in one or more column of pixels in the binarized image document and the horizontal paths may be detected as arrays of successive black pixels in one or more rows of pixels in the binarized image document. The extracted text, extracted paths, and extracted images may be stored at a data store, and are retrieved from the data store in order to create a flow document from the image document using the extracted text, paths, and images.

According to some embodiments, a computer-readable memory device with instructions stored thereon to detect and extract one or more components of an image document is described. Example instructions may include receiving an image document comprising text, one or more paths, and one or more images, employing OCR to detect the text from the image document, and binarizing the image document to enable detection of the paths in the image document using one or more algorithms, where the detected text may be extracted from the binarized image document prior to detection of the paths. The example instructions may also include determining a rotation angle of the binarized image document using the detected paths, where the binarized image document may be rotated based on the determined rotation angle, extracting the detected paths on the binarized image document to enable detection of the images using the algorithms, and extracting the detected images from the binarized image document.

In other embodiments, the example instructions may further include combining the detected paths into connected components in order to determine the rotation angle, where the detected paths may be vertical paths and horizontal paths that are combined separately. The example instructions may yet further include discarding the connected components from the vertical paths that are small in height compared to the image document and the connected components from the horizontal paths that are small in width compared to the image document, and discarding the connected components from the vertical paths and the horizontal paths that are not linear.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part on a computing device to detect and extract one or more components of a document in image format, the method comprising:
    receiving the document in image format, wherein a content of the document includes text, one or more paths and one or more images,
    detecting the text within the content of the document in image format;
    binarizing the document in image format;
    extracting the detected text from the content of the binarized document in image format;
    detecting the one or more paths within the content of the document in image format, wherein the one or more paths represent basic elements of the content of the document in image format;
    extracting the one or more detected paths from the binarized document in image format by coloring a bounding box for each detected path into a background color and determining the background color by counting a number of black and white pixels surrounding the bounding box;
    detecting the one or more images from the content of the binarized document in image format; and
    extracting the one or more detected images from the binarized document in image format.

2. The method of claim 1, wherein detecting the text of the image document comprises:
    employing optical character recognition (OCR) on the content of the binarized document in image format.

3. The method of claim 2, further comprising:
    determining recognized text, a bounding box, an array of glyphs, and one or more baseline points for each word in the detected text.

4. The method of claim 1, wherein binarizing the document in image format comprises:
    creating an image, wherein the text, the one or more paths, and the one or more images of the document in image format are displayed as black pixels in the created image.

5. The method of claim 4, wherein a Sauvola binarization method is used to binarize the document in image format.

6. The method of claim 1, wherein detection of the one or more images using the one or more algorithms comprises:
    determining one or more connected components on the binarized document in image format, wherein a connected component is one or more touching pixels;
    aggregating the connected components to detect the one or more images; and
    developing one or more tables from the aggregated components to represent the one or more detected components, wherein one or more cells in the one or more tables represent one or more components of the one or more detected images.

7. The method of claim 6, wherein extracting the one or more detected images from the binarized document in image format comprises:
    coloring a bounding box for each cell in the one or more tables into a background color.

8. The method of claim 1, wherein extracting the text from the content of the binarized document in image format comprises:
    coloring a bounding box above a baseline for each word in the detected text into a background color.

9. The method of claim 1, wherein the background color is black if a higher number of black pixels than white pixels are counted surrounding the bounding box, and the background color is white if a higher number of white pixels than black pixels are counted surrounding the bounding box.

10. The method of claim 1, further comprising:
    removing noise from the binarized document in image format prior to detection of the one or more paths, wherein the noise is one or more black pixels present in the binarized document in image format that are not the text, the one or more paths, and the one or more images of the document in image format.

11. The method of claim 1 further comprising:
    determining a rotation angle of the binarized document in image format using one of: the one or more detected paths and one or more lines detected from OCR; and
    rotating the binarized document in image format based on the determined rotation angle.

12. A computing device to detect and extract one or more components of a document in image format, the computing device comprising:
    a memory storing instructions; and
    a processor coupled to the memory, the processor executing a component detection application in conjunction with the instructions stored in the memory, wherein the component; detection application is configured to:
    receive the document in image format, wherein a content of the document includes text, one or more paths, and one or more images;
    employ optical character recognition (OCR) to detect the text within the content of the document in image format;
    binarize the document in image format;
    extract the detected text from the content of the binarized document in image for at;
    detect the one or more paths within the content of the document in image, format, wherein the one or more paths represent basic elements of the content of the document in image format;
    extract the one or more detected paths on the binarized document in image format by coloring a bounding box for each detected path into a background color and determining the background color by counting a number of black and white pixels surrounding the bounding box;
    detect the one or more images from the content of the binarized document in image format; and
    extract the one or more detected images from the binarized document in image format.

13. The computing device of claim 12, wherein the one or more detected paths are vertical, paths and horizontal paths.

14. The computing device of claim 13, wherein the vertical paths are detected as arrays of successive black pixels in one or more column of pixels in the binarized document in image format and the horizontal paths are detected as arrays of successive black pixels in one or more rows of pixels in the binarized document in image format.

15. The computing device of claim 12, wherein the extracted text, one or more extracted paths, and one or more extracted images are stored at a data store, and are retrieved from the data store in order to create a flow document from the document in image format using the extracted text, one or more extracted paths, and one or more extracted images.

16. A computer-readable memory device with instructions stored thereon to detect and extract one or more components of a document in image format, the instructions comprising:

receiving the document in image format wherein a content of the document includes text, one or more paths, and one or more images;

employing optical character recognition (OCR) to detect the text within the content of the document in image format:

binarizing the document in image format;

extracting the detected text from the content of the binarized document in image format;

detecting the one or more paths within the content of the document in image format, wherein the one or more paths represent basic elements of the content of the document in image format;

determining a rotation angle of the binarized document in image format using the one or more detected paths;

rotating the binarized document in image format based on the determined rotation angle;

extracting the one or more detected paths on the binarized document in image format by coloring a bounding box for each detected path into a background color and determining the background color by counting a number of black and white pixels surrounding the bounding box;

detecting the one or more images from the content of the binarized document in image format; and extracting the one or more detected images from the binarized document in image format.

17. The computer-readable memory device of claim 16, wherein the instructions further comprise:

combining the one or more detected paths into connected components in order to determine the rotation angle, wherein the one or more detected paths are vertical paths and horizontal paths that are combined separately.

18. The computer-readable memory device of claim 17, wherein the instructions further comprise:

discarding the connected components from the vertical paths that are small in height compared to the document in image format and the connected components from the horizontal paths that are small in width compared to the document in image format; and discarding the connected components from the vertical paths and the horizontal paths that are not linear.

* * * * *